April 1, 1924.

J.W. HARASTA

Re. 15,806

EXPANDING PACKING CONSTRUCTION

Original Filed Sept. 8, 1920

2 Sheets-Sheet 1

Inventor
Joseph W. Harasta.

By Lyon & Lyon Attys

April 1, 1924. Re. 15,806

J.W. HARASTA

EXPANDING PACKING CONSTRUCTION

Original Filed Sept. 8, 1920 2 Sheets-Sheet 2

Inventor
Joseph W. Harasta
By Lyon & Lyon
Attys.

Reissued Apr. 1, 1924. Re. 15,806

UNITED STATES PATENT OFFICE.

JOSEPH W. HARASTA, OF LOS ANGELES, CALIFORNIA.

EXPANDING PACKING CONSTRUCTION.

Original No. 1,396,836, dated November 15, 1921, Serial No. 408,826, filed September 8, 1920. Application for reissue filed December 29, 1922. Serial No. 609,768.

*To all whom it may concern:*

I, JOSEPH W. HARASTA, a citizen of the United States, and residing at Los Angeles, in the county of Los Angeles and State of California, have invented new and useful Improvements in an Expanding Packing Construction, of which the following is a specification.

This invention relates to reciprocating piston pumps, motors, and the like, and pertains particularly to means for expanding the packing of said pistons without disassembling the cylinder and piston.

Expanding packing has been provided for pistons, and means whereby the packing may be expanded by adjustment of piston parts of special construction. Such devices require either or both the disassembling of the pistons or parts thereof or the removal of the cylinder heads to provide access to the pistons. Removal of the cylinder heads as it is ordinarily performed, results in destruction of the gasket and upon replacement of the head requires insertion of the gasket. As, many bolts are employed to secure the head to the cylinder, much time is consumed in such operations. This results in the placing the plant out of operation during the time the packing is being adjusted and further loss of time of the other operatives of the plant.

It is the primary object of this invention to provide a cylinder and piston construction, whereby packing may be expanded without removal of the cylinder heads. Another object of the invention is the provision of a piston which may employ any of the well known type of packings and means whereby the packing may be expanded. Without expanding means the packing after slight wear becomes unfit for use and must be discarded. This results in a large waste of material. With devices for expanding the packing, as at present employed, special packing must be used. In addition to the broader features of this invention there are certain details of construction, whereby a simple, durable, and easily manipulated structure is obtained.

Figure 1:
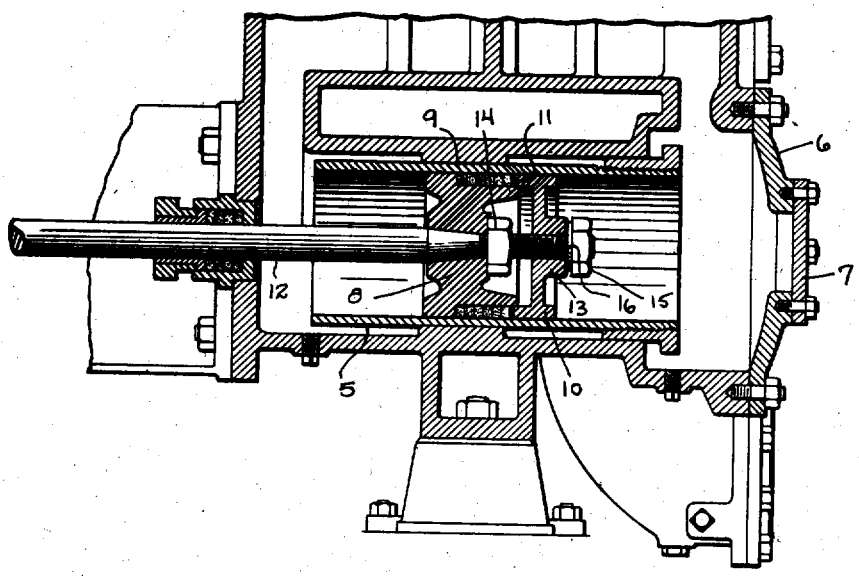
Figure 2:
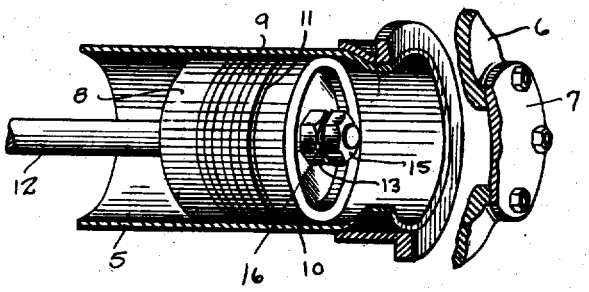
Figure 3:
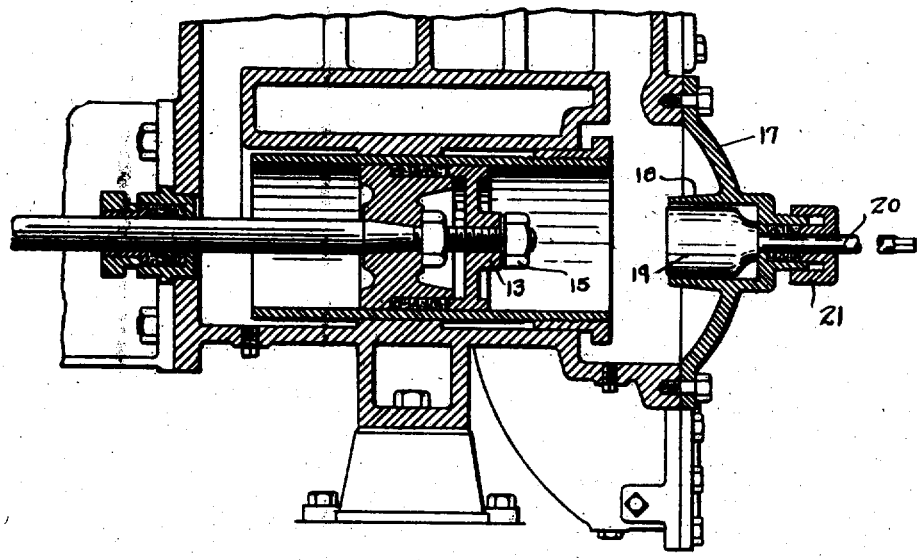

These objects together with other objects and corresponding accomplishments are obtained by means of the embodiment of my invention illustrated in the accompanying drawing, in which:

Figure 1 is a longitudinal section through a pump cylinder and piston employing one form of my invention; Fig. 2 is a perspective view of a piston and a cylinder barrel shown in section with the head removed; Fig. 3 is a section through a cylinder and piston employing another form of my invention; and Fig. 4 is a perspective view partially in section of a construction such as shown in Fig. 3 with a cylinder barrel.

Referring more particularly to Figs. 1 and 2, a pump cylinder of the usual construction is shown. The barrel is indicated generally by 5. Secured to the cylinder is a head 6. A piston rod 12 carries the body 8 of the piston and has a threaded extension beyond the body having a thread connection with a follower, and I provide an opening in the head of the cylinder aligning with the axis of the piston, whereby means placed in the opening and operatable from the exterior may rotate the follower to advance it toward the body; this compresses and adjusts the packing. The head has a hand hole closed by a cover plate 7. By removal of the cover plate, access to the barrel of the pump and the piston is provided. In Fig. 2 the barrel 5 forms the cylinder proper, otherwise the construction is the same. Mounted in the barrel for reciprocation is a piston having a body 8 formed with a packing groove in which is disposed packing 9. This packing may be the ordinary square type or sleeve type of packing. Telescoping the piston body is a follower 10, a washer 11 being disposed against the packing. The construction which enables the packing to be adjusted is preferably in the form of a nut-and-screw device, that is, a nut-and-thread device which will now be described. The piston rod 12 is tapered adjacent its end and the tapered portion extends into a hole in the body. The end of the rod is reduced in diameter and threaded, the threaded portion extending beyond the body 8 and through a threaded bore of hub 13 of the follower. Firmly securing the piston body in position on the rod is a nut 14. The follower is adjustably secured to the rod by means of the threads, and a lock nut 15 is preferably provided, disposed on the rod with a lock washer 16 interposed between the nut and the hub of the follower. The construction is such that by turning the follower on the rod, pressure may be placed upon the packing and the latter expanded, and the construction of the piston rod beyond the piston is such as to render the hub of the follower accessible to a tool thrust over the end of the piston rod.

To expand the piston packing, the cover 7 is removed and a socket wrench or other tool applied to the nut 15 so that it may be loosened and with it the lock washer. In practice a quarter turn of the nut is sufficient to loosen it. The socket of the wrench can then be applied to the follower at the hub 13 which has the same dimensions as the nut across its flats, and the follower turned to give the expansion desired. In practice a half turn is sufficient. The lock washer 16 and the nut 15 may then be tightened against the hub 13. The cover 7 is again bolted to the head. If a gasket is placed between the cover plate and the cylinder head, the destruction of the same will not incur as much expense, as the destruction of the cylinder head gasket. Furthermore, the number of bolts to be removed is small compared with the number of bolts which it would be necessary to remove for taking down the cylinder head. Thus, time, labor, and material are saved.

Figure 4:
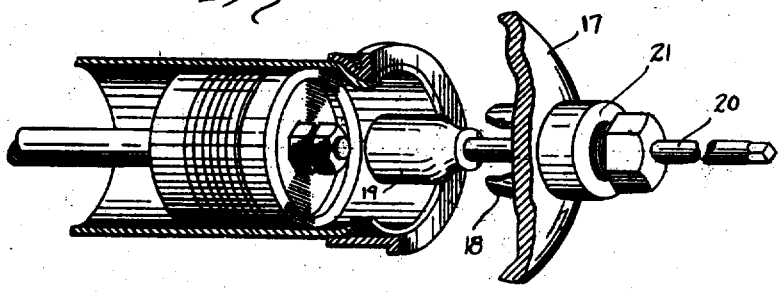

Referring more particularly to Figs. 3 and 4, the piston construction is identical with that shown in Figs. 1 and 2.

Referring to Fig. 3, the head 17 is provided with a pocket 18 in which rests the socket wrench 19. The socket wrench is provided with a stem 20 having a flattened end.

This stem extends through a stuffing box and follower indicated generally by 21. The follower of the stuffing box is normally adjusted to tightly grip the stem.

The construction is such that, when it is desired to expand the packing, the follower on the stuffing box is turned to loosen the grip on the stem and permit the wrench to be moved into the barrel and turned. The wrench socket may then be applied to the nut 15 and the latter loosened. Thereupon the wrench is pushed further in until the socket slides over the hub 13, and the follower is then turned so as to properly expand the packing. The wrench socket is then withdrawn slightly to release the hub but maintain engagement with the nut 15. The nut is then rotated to tighten it and lock the follower. The wrench socket is then withdrawn into the pocket and the stuffing box follower tightened.

In the construction shown in Fig. 4, the barrel of the pump forms the cylinder, the head 17 being secured directly thereto. However, the head is identical in construction with the head shown in Fig. 3.

It is obvious that I have provided a construction wherein the packing may be expanded without disassembling the pump. Furthermore, special packing is not required for the piston. Time, labor, and material are saved thereby. Saving of time results in the plant being out of operation only a short while.

What I claim is:

1. In a device of the class described, the combination of a cylinder, a piston rod, a reciprocating piston body therein fixed on said rod and having expansible packing, a follower movable longitudinally of the piston body for expanding said packing and disposed so that said rod extends beyond said follower, a nut and screw device mounted on said rod for moving said follower and holding it fixed in adjusted position, a cylinder head having a pocket, a socket wrench disposed in said pocket and having its stem slidably and rotatably extended through said head for expanding said packing whereby said packing may be expanded from the outside of said cylinder.

2. A piston comprising in combination a piston rod having a threaded end, a piston body fixed on said rod with the threaded end extending therethrough, said piston body being provided with a portion of reduced diameter forming a packing channel, a follower threaded on the extension of said rod and having a hub provided with a wrench hold, said follower telescoping with the reduced portion of said body and forming therewith an adjustable packing groove, and a lock nut on the threaded end of said rod for holding said follower in position, and having the same dimensions across its flats to enable the said wrench hold to be operated by a socket thrust over the nut.

3. In a pump, a piston structure comprising: a piston rod; a head secured axially on said piston rod; a cap threaded on said piston rod; packing between said head and said cap; and means extending outside the cylinder of the pump for turning said cap on said piston rod.

4. In a pump, a piston structure comprising: a piston rod having a threaded end; a head on said piston rod; means threaded on said threaded end of said piston rod for securing said piston head on said piston rod; a cap threaded on said piston rod outside said means; packing between said head and said cap; and means extending outside the cylinder of the pump for turning said cap on said piston rod.

5. In a device of the class described, the combination of a cylinder, a piston mounted to reciprocate within the cylinder and comprising a body and a follower telescoping the body and movable longitudinally of the axis of the body, said body having a packing recess, packing received in the recess so as to be clamped between the said body and follower, a piston rod carrying the said body and having a threaded portion beyond the body, said follower having a thread connection with the said threaded portion, and a cylinder head having an opening aligning with the axis of the piston, whereby means rotating in said opening may rotate said follower from the exterior of the cylinder to adjust the said packing.

6. In a device of the class described, the combination of a cylinder, a piston mounted to reciprocate within the cylinder and comprising a body and a follower telescoping the body and movable longitudinally of the axis of the body, said body having a packing recess, packing received in the recess so as to be clamped between the said body and follower, a piston rod carrying the said body and having a threaded portion beyond the body, said follower having a thread connection with the said threaded portion, and having a hub of angular form enabling the follower to be rotated by a wrench, and a cylinder head having an opening aligning with the axis of the piston, whereby a wrench axially disposed through the said opening, may be rotated from the exterior of the cylinder to adjust the said packing.

7. A follower adapted to adjust the packing of a piston body in a cylinder, said follower having an outer diameter to fit the cylinder and having a flange projecting therefrom to telescope with the piston body at the packing recess, and having a recess adjacent said flange to provide clearance for the end of the piston head permitting the follower to advance and clamp the packing, said follower having a threaded opening therethrough for securing the same to the piston rod and having a hub accessible to a socket wrench slipped over the end of the piston rod and adapted to cooperate with the socket wrench to enable the follower to be rotated from without the cylinder head to adjust the packing.

8. In a device of the class described, the combination of a cylinder, a piston with packing mounted to reciprocate therein, a cylinder head having an opening aligning with the axis of the cylinder, a spindle mounted to slide and rotate in said opening, a stuffing box on the head having means for packing said spindle, a socket at the inner end of the spindle, said piston having means to cooperate with the socket to effect an adjustment of the piston packing, said spindle operating to enable the socket to be held normally in a withdrawn position to permit reciprocation of the piston and enabling the socket to be moved inwardly to engage the piston to effect the adjustment of the packing.

In testimony whereof, witness my hand at Los Angeles, California, this 16th day of December, 1922.

JOSEPH W. HARASTA.